United States Patent
Bose et al.

(10) Patent No.: US 12,400,243 B2
(45) Date of Patent: Aug. 26, 2025

(54) METHOD AND SYSTEM FOR DELIVERING REAL-TIME PERSONALIZATION ACROSS A DISTRIBUTED, MODULAR NETWORK ARCHITECTURE

(71) Applicant: JPMorgan Chase Bank, N.A., New York, NY (US)

(72) Inventors: Abhijit Bose, Paramus, NJ (US); Gavin C. Michael, New York, NY (US); Michael Lewis, Stamford, CT (US); Constantin Gonciulea, Columbus, OH (US); Jason Troy Penshorn, Columbus, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 128 days.

(21) Appl. No.: 17/643,325

(22) Filed: Dec. 8, 2021

(65) Prior Publication Data

US 2022/0101377 A1 Mar. 31, 2022

Related U.S. Application Data (63) Continuation of application No. 14/983,812, filed on Dec. 30, 2015, now Pat. No. 11,232,484.
(Continued)

(51) Int. Cl.
*G06Q 30/0251* (2023.01)
*H04L 67/01* (2022.01)
(Continued)

(52) U.S. Cl.
CPC ..... *G06Q 30/0271* (2013.01); *G06Q 30/0255* (2013.01); *H04L 67/01* (2022.05);
(Continued)

(58) Field of Classification Search
CPC ............ G06Q 30/0255; G06Q 30/0271; H04L 67/01; H04L 67/535; H04L 67/561;
(Continued)

(56) References Cited

U.S. PATENT DOCUMENTS 9,612,925 B1 4/2017 Lewis et al.
9,652,341 B1 5/2017 Lewis et al.
(Continued)

FOREIGN PATENT DOCUMENTS

GB 2502675 A * 12/2013 ......... G06F 17/3089

OTHER PUBLICATIONS

Personalized Information Systems: Enabling Technologies and Architecture Jose Luis Reis, Joao Alvaro Carvalho (Year: 2012).*
VCloud NFV OpenStack Edition Reference Architecture VMware vCloud NFV 2.0 VMware vCloud NFV OpenStack Edition 2.0 (Year: 2018).

*Primary Examiner* — Alexandru Cirnu
(74) *Attorney, Agent, or Firm* — Greenblum & Bernstein, P.L.C.

(57) ABSTRACT

According to an embodiment of the present invention, an automated computer implemented method and system for providing targeted content in real-time comprises a web and application server that identifies one or more user interactions from a user on a website hosted by an entity; a processor that receives the one or more user interactions and converts the one or more user interactions into one or more real-time attributes; and an engine that identifies customized content for the user from a remote processor, adjusts the customized content based on the one or more real-time attributes, and generates an output comprising the customized content for display on the website for the user in real-time.

20 Claims, 4 Drawing Sheets

Related U.S. Application Data (60) Provisional application No. 62/098,389, filed on Dec. 31, 2014.

(51) Int. Cl.
*H04L 67/02* (2022.01)
*H04L 67/50* (2022.01)
*H04L 67/306* (2022.01)

(52) U.S. Cl.
CPC ............ *H04L 67/02* (2013.01); *H04L 67/535* (2022.05); *H04L 67/306* (2013.01)

(58) Field of Classification Search
CPC ..... H04L 67/565; H04L 67/306; H04L 67/02; H04L 67/562
See application file for complete search history.

(56) References Cited

U.S. PATENT DOCUMENTS

| | | | |
|---|---|---|---|
| RE47,896 E | * | 3/2020 | Liberman Ben-Ami .................... H04M 3/5191 |
| 2007/0260696 A1 | | 11/2007 | Bohannon et al. |
| 2011/0184813 A1 | * | 7/2011 | Barnes ................ G06F 16/9535 705/14.66 |
| 2013/0085853 A1 | * | 4/2013 | Tseng ...................... H04L 51/52 705/14.68 |
| 2014/0025735 A1 | | 1/2014 | Garcia-Martinez et al. |
| 2014/0237188 A1 | | 8/2014 | Tran et al. |
| 2015/0019329 A1 | | 1/2015 | Ramer et al. |
| 2016/0029155 A1 | | 1/2016 | Kerr et al. |
| 2016/0105502 A1 | * | 4/2016 | Shen ...................... H04L 45/44 709/205 |

* cited by examiner

METHOD AND SYSTEM FOR DELIVERING REAL-TIME PERSONALIZATION ACROSS A DISTRIBUTED, MODULAR NETWORK ARCHITECTURE

CROSS REFERENCE TO RELATED APPLICATIONS

This application is a Continuation of U.S. Utility patent application Ser. No. 14/983,812, filed Dec. 30, 2015, which claims priority to U.S. Provisional Application No. 62/098,389, filed Dec. 31, 2014, the contents of which are incorporated herein by reference in its entirety.

This application is related to U.S. patent application Ser. No. 14/568,780, filed Dec. 12, 2014, and U.S. patent application Ser. No. 14/568,850, filed Dec. 12, 2014, the contents of which are incorporated herein by reference in their entirety.

FIELD OF THE INVENTION

The present invention generally relates systems and methods for delivering real-time personalization across a distributed, modular network architecture.

BACKGROUND OF THE INVENTION

Customers generally expect a level of personalization from service providers and essentially every interaction on any website. Users respond better when the information presented is targeted and relevant. Personalization further promotes customer loyalty and enhances the entity's brand recognition. However, most service providers are limited in their ability to provide customized content in a timely manner. Oftentimes, customization is limited to the look and feel of the website but the content presented is still on a more generic level. Moreover, current systems do not necessarily let their customers customize the actual user experience.

These and other drawbacks may also be present.

SUMMARY OF THE INVENTION

Accordingly, one aspect of the invention is to address one or more of the drawbacks set forth above. According to an embodiment of the present invention, a method and system for providing targeted content in real-time comprises: a web and application server that identifies one or more user interactions from a user on a website hosted by an entity; a processor that receives the one or more user interactions and converts the one or more user interactions into one or more real-time attributes; and an engine that identifies customized content for the user from a remote processor, adjusts the customized content based on the one or more real-time attributes, and generates an output comprising the customized content for display on the website for the user in real-time.

According to an embodiment of the present invention, a method and system for providing targeted content in real-time comprises: a marketing platform that identifies marketing data for a customer; an enterprise messaging broker that receives one or more messages from an external source that captures one or more actions from the customer; a master data repository that receives the one or more messages and identifies a content for the customer in response to the marketing data and the one or more messages; wherein the content has an associated indication of relevancy; and a router that forwards the content and the indication of relevancy to a local processing unit to be combined with one or more real-time attributes for the customer.

In other exemplary embodiments, the preceding method may be performed using a system with a processor and a memory comprising computer-readable instructions which when executed by the processor cause the processor to perform the method steps.

These and other embodiments and advantages of the invention will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DETAILED DESCRIPTION OF PREFERRED EMBODIMENTS

An embodiment of the present invention is directed to a network architecture that implements a local layer in communication with an enterprise layer. The local layer provides a real-time layer and a serving layer hosted by a pod or other local processing unit. The real-time layer may receive inputs from the user and generate real-time attributes. The serving layer may receive the real-time attributes and generate personalized content for the user. Content may be generated by the enterprise layer and then further refined and customized on-the-fly at the local layer. An embodiment of the present invention is directed to analyzing a customer's interaction with a website or interface and providing customized highly targeted content on-the-fly in response. The local layer may be implemented on one or more processing units, such as a pod.

An embodiment of the present invention is directed an improved architecture that comprises co-location facilities where each co-location may contain two or more groups of customers, which may be managed in an independent set of infrastructure referred to as a "pod." Each pod may represent a physical representation of a website for a discrete group of customers or users.

An embodiment of the present invention is directed to a distributed architecture that seeks to replicate functions and capabilities for a set of customers of a larger enterprise application at a local site. Other functions and capabilities for other sets of customers may be replicated at other local sites. This architecture reduces the company's footprint to a manageable size and focuses on addressing a particular customer base. According to the Pod architecture, data for customers may be replicated from an enterprise or other central location, and made available to a specific pod that is geographically relevant to those customers for performance and resiliency.

According to an embodiment of the present invention, each co-location facility may have a failover pod which may support another pod in the event of a failover. In the event of a total co-location failure, each pod of the co-location may failover to different locations. From a commercial perspective of an exemplary embodiment of the present invention, a co-location may only be required to have half the extra capacity to support a failover.

The co-location configuration may include three pods, two of which support active customer segments during normal operations and a third pod reserved for failover of either of two adjacent co-locations. Other configurations may be implemented that involves different number of pod s. For example, the co-location may have multiple customer sets along with multiple failure mode pods, depending on the overall system or network architecture. Other architectures and schemes may be implemented. A network may include co-locations with three pods in some areas and other co-locations with more than three pods in other areas. For example, co-locations that service a denser population may maintain more than three pods. The population factor may also consider customer usage, services enrolled, behavior, marketing efforts, etc., not just the number of customers.

To improve performance and resiliency of the digital platform, a subset of enterprise data may be replicated to each pod. The enterprise data may include data that is read often but changes relatively infrequently.

Figure 1:
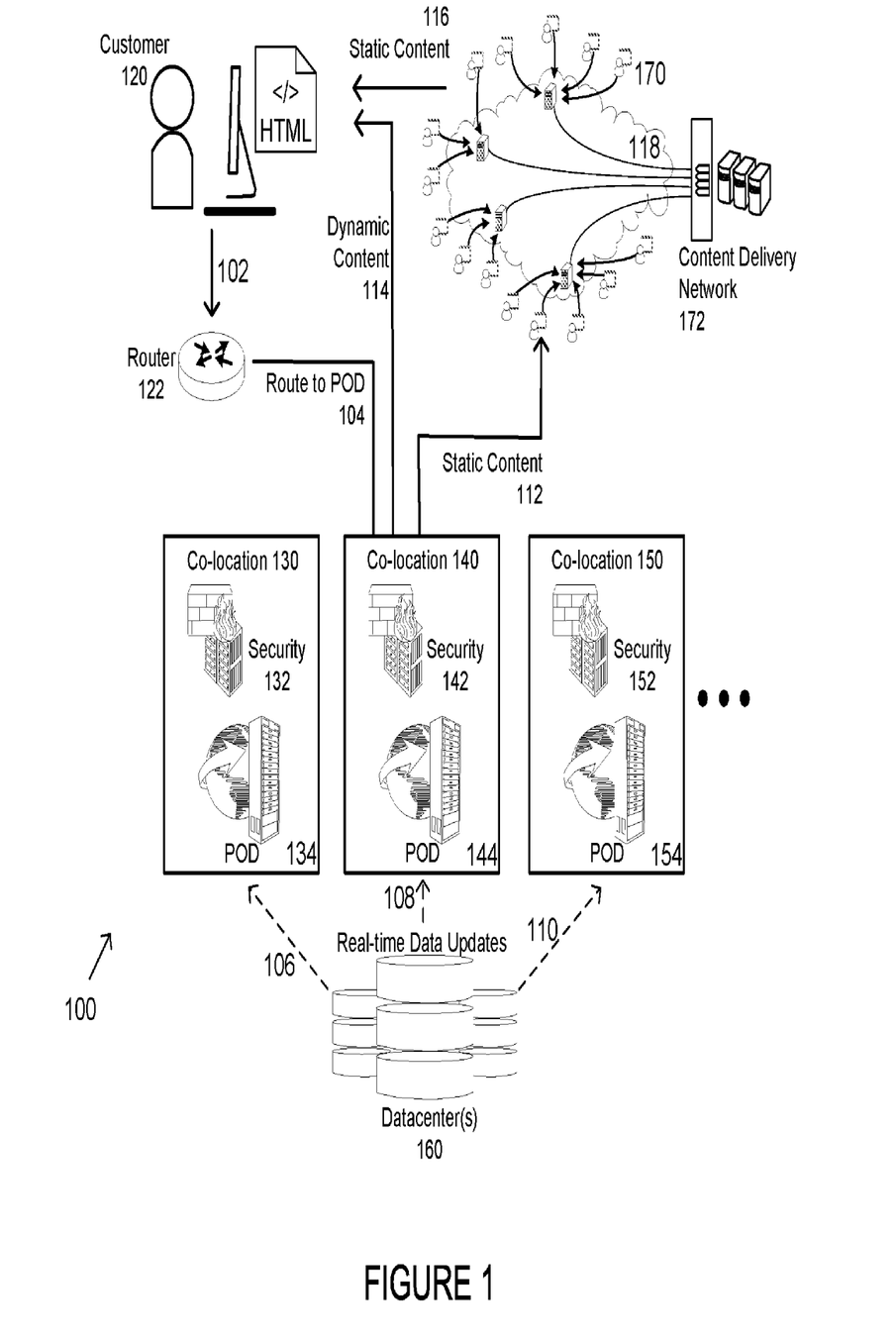
FIG. 1 is an exemplary diagram of a Pod-based digital architecture, according to an embodiment of the present invention.

FIG. 1 is an exemplary diagram of a pod-based digital architecture, according to an embodiment of the present invention. The pod-based architecture may include multiple co-locations distributed across geographic locations. Each co-location may include multiple pods that receive enterprise data relevant to a particular segment of customers or users. An architecture of an embodiment of the present invention is directed to placing data closer to the customer, to improve performance and availability via a highly distributed architecture with independent co-locations and pods within each co-location. With the pod-based architecture of an embodiment of the present invention, as a customer's data changes in the enterprise, it may be streamed real-time to the relevant pod. This allows a customer to continue to do business even if back-end systems are not available or otherwise impaired.

As shown in FIG. 1, a customer 120 may access a website via a user interface. The website may be hosted by an entity that provides a service, information and/or product. Entities may include, by way of example, a financial institution, corporation, merchant, service provider, etc. Upon a user action or other interaction via the website or user interface, the request may be sent to a Router 122, via 102. The request may be a request to perform various functions available to the user. Functions may depend on the application, business, etc.

According to another embodiment of the present invention, each pod may host a website or other electronic interface where users may access data as well as provide data. For example, a user may submit and access information through User Interface to view data, submit requests, provide data and/or perform other actions. Each pod may communicate with various entities via communication networks. For example, Pod 134 may receive inputs from a customer. The user interface may provide a user interactive display.

Router 122 may then route the request, via 104, to an appropriate co-location facility, shown by 130, 140 and 150, respectively. Each co-location facility, represented by 130, 140 and 150, may include a Security interface, represented by 132, 142 and 152, and a set of pods, represented by 134, 144, 154, respectively. Dynamic data may be forwarded to the user via 114. Static content may be transmitted from a co-location facility to a content delivery network shown by 170, via route 112. Content may be delivered from a remote facility shown by 172 via network 170. Static content may be then be delivered to the user, via 116.

For example, Pod 134 may represent two or more pods where each pod is designated to a user or customer segment. Additional pods may be implemented across various geographic areas. The pods may be scaled horizontally to any number. For example, some entities may need a small number of co-locations concentrated in specific areas whereas other entities may implement a large number of co-location distributed across the country and beyond.

The co-locations may be supported by a main processing center, such as an enterprise. Enterprise may include one or more datacenters and/or processing centers. As illustrated in FIG. 1, representative Datacenter 160 may provide updates, such as real-time updates, to each of the pods. For example, in the financial institution application, Datacenter 160 may provide updates relating to data, such as DDA, card, mortgage, automobile loans, line of credit, investments, etc. Datacenters may be located at a centralized location or distributed across multiple areas.

While a single datacenter is illustrated in exemplary FIG. 1, the system may include multiple databases at the same location or separated through multiple locations. The databases may be further combined and/or separated. In addition, the databases may be supported by a Host Entity or an independent service provider. For example, an independent service provider may support the one or more databases and/or other functionality at a remote location. Other architectures may be realized. The components of the exemplary system diagrams may be duplicated, combined, separated and/or otherwise modified, as desired by various applications of the embodiments of the present invention as well as different environments and platforms.

Additional features may include a responsive design where the application is designed to be responsive to any screen size. A pipelining function enables elements on a page to be loaded asynchronously which results in reduced blocking and waiting. The architecture of an embodiment of the present invention may scale in various dimensions, e.g., adding more hardware instances; splitting customers into specific pods based on geography; and separating tasks into independent processing or swim lanes.

The Pod-based architecture of an embodiment of the present invention is directed to performance, availability and customer experience. As for performance, a remote data call will always be slower than a local data call. As for availability, local data has fewer data points of failure, e.g., WAN, switches, routers can and do fail. As for customer experience, the combination of better performance and higher availability ultimately leads to a better customer experience.

An example of the Pod-based architecture, according to one embodiment, is provided in U.S. patent application Ser. No. 14/568,780, filed Dec. 12, 2014, and U.S. patent application Ser. No. 14/568,850, filed Dec. 12, 2014, the disclosures of which are incorporated by reference in their entireties.

According to an embodiment of the present invention, the pod architecture may include one or more pods that implements a local layer that communicates with an enterprise layer hosted by an enterprise or other central processor. The local layer provides a real-time layer and a serving layer hosted by a pod or other local processing unit. The real-time layer may receive inputs from the user and generate real-time attributes. The serving layer of the local layer may receive the real-time attributes and identify content for the user. For example, content may be identified by engines at the local layer. Also, content may be generated by the enterprise layer and then further refined and customized on-the-fly at the local layer of the pod. An embodiment of the present invention is directed to analyzing a customer's interaction with a website or interface and providing customized highly targeted content in real-time.

According to an exemplary embodiment, the real-time layer of the local layer may include a web and application server that communicates with a message broker. The message broker may communicate with a real-time index store through a stream processor that converts messages and other data into real-time attributes. A real-time index store may receive the real-time attributes and communicate with a merge query function engine and data pipeline. The real-time index store may also communicate with a real-time search query engine (e.g., an elastic search), where the communication may occur through a data router. The merge query, index store and elastic search may deliver content through the data pipeline back to the web and application server in the local layer.

The serving layer of the local layer may determine, based on macro-like signals and/or other data, what content should be offered to the user. The determination may also include specifics, a range of possibilities, time period, amounts, incentives, etc. The local layer may also revise or modify an indication of relevancy for a particular content (the indication of relevancy may include scores, ranks, etc.) so that the content, which may include advertisement, offer, reward, message, etc., may be customized and presented to the user.

The messaging broker may communicate real time data to an enterprise messaging broker at a centralized off-line enterprise layer. A series of data platforms, intelligence platforms and/or marketing platforms may determine content to be delivered to the user. This information may be routed through a content store, which may be delivered with the content decisions to personalize the consumers experience while interacting with the web and application servers. Accordingly, the use of real-time data stores, merge query functions, data intelligence platform and messaging brokers across real-time and latent layers improves the quality of content that is delivered to the web and application server.

Figure 2:
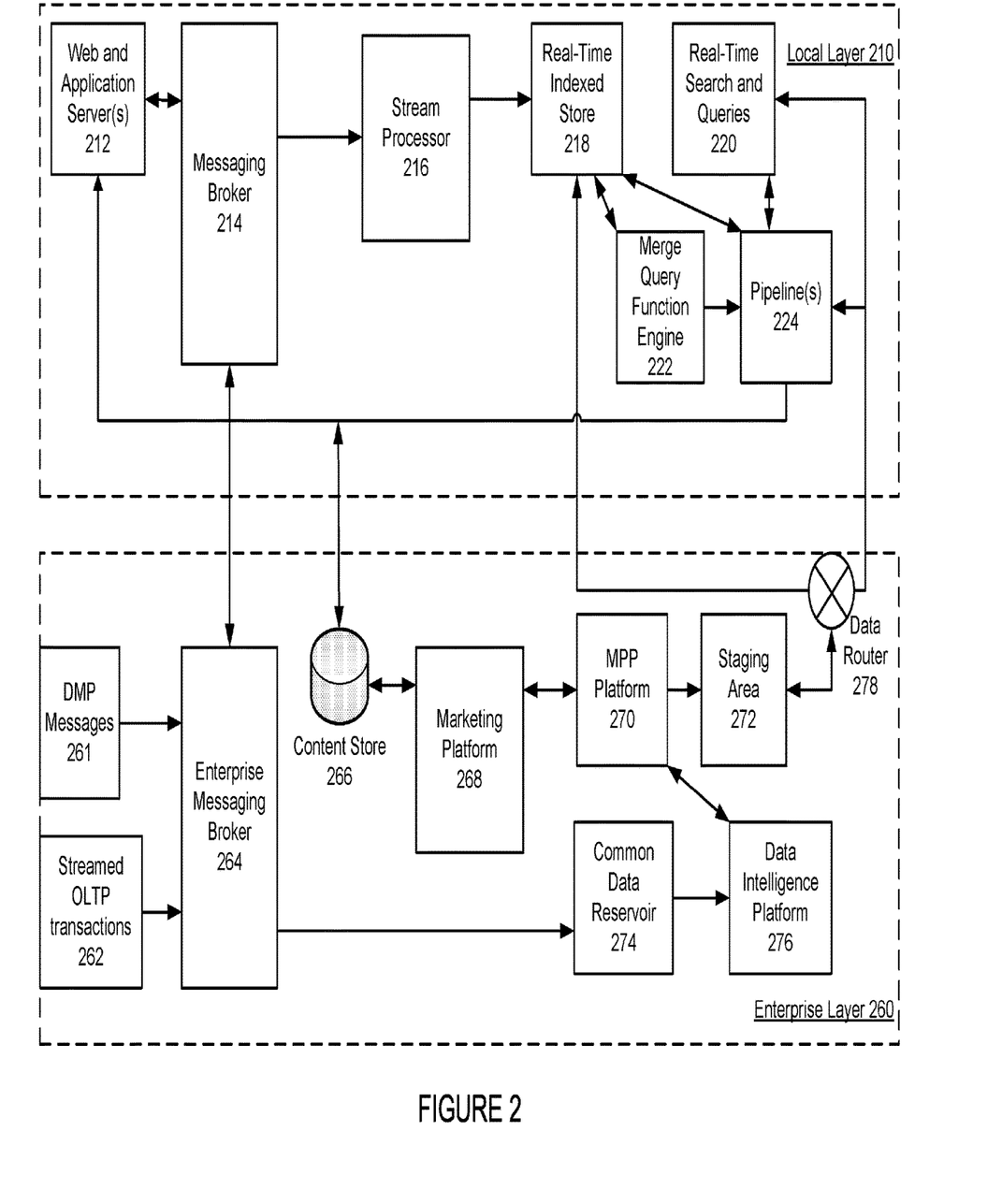
FIG. 2 is an exemplary illustration of a personalization architecture, according to an embodiment of the present invention.

FIG. 2 is an exemplary illustration of a personalization architecture, according to an embodiment of the present invention. An embodiment of the present invention is directed to a system for delivering real-time personalization across a distributed, modular network architecture. Local Layer 210 may include a real-time layer and a serving layer. Real-time layer may include Web and Application Servers 212, Messaging Broker 214 and a Stream Processor 216. Also, Messaging Broker 214 may communicate with Enterprise Messaging Broker 264. Serving layer may include a Real-time Indexed Store 218, Real-time Search and Queries 220, Merge Query Function Engine 222 and Pipeline(s) 224. Local Layer 210 may communicate with an Enterprise Layer 260.

Communication between Local Layer 210 and Enterprise Layer 260 may be over a communication network or other communication link. Also, each pod or other local unit may communicate with neighboring other pods or local units as well via a communication network or other communication link.

Enterprise Layer 260 may include a real-time layer and a batch layer. Real-time layer of the Enterprise Layer 260 may include message interfaces, such as DMP Messages 261 and Streamed OLTP Transactions 262, as well as Enterprise Messaging Broker 264, and Content Store 266. The real-time components are shown in the local layer 210 for an optimal performance, but they may also be deployed in the Enterprise Layer 260 The Batch Layer of the Enterprise layer 260 may include Marketing Platform 268, Common Data Reservoir 274, MPP Platform 270, Data Intelligence Platform 276, a Staging Area 272, and a Router 278.

Local Layer 210 may be implemented in a local unit, such as a pod. An exemplary network architecture may include pods distributed across various locations where each pod may implement a local layer, as shown by Local Layer 210. Each pod may communicate with a centralized unit, such as an Enterprise. The Enterprise may implement an enterprise layer, as shown by Enterprise Layer 260. The Enterprise may be a centralized and/or further distributed.

While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

A user or customer may interact with an entity via an interface, such as a website. The user may access information, submit requests, purchase goods, exchange data, and perform other functions made available to the user by the entity hosting the interface. The entity may be any entity that provides information or services, such as a service provider, financial institution, merchant, etc. During the user's interaction with the website, the user's actions may be captured by a web server, represented by Web and Application Servers 212. Web and Application Servers 212 may include websites, applications, interfaces that may be hosted on one or more servers. The Web and Application Servers 212 may monitor a user's interaction with a website and/or an application. User interaction may include passive and active actions, such as mouse clicks, mouse moves, mouse hovers, scrolling up, scrolling down, how long a user in one a page or section, click forwards, click backs, single clicks, double clicks, access to another page or website, etc. For example, if a user selects "mortgage," Web and Application Servers 212 may capture that selection as well as the time the user spends on the selection, the next user actions, etc. In addition, Web and Application Servers 212 may also capture how the user interacts with the information, such as whether the user scrolls down the page, user clicks, time spent, etc. The collected information may be captured in real-time or substantially in real-time.

Web and Application Servers 212 may provide information on the detected events to Messaging Broker 214. According to an exemplary embodiment, Messaging Broker 214 may comprise a distributed set of processors that receives a stream of events coming from the users accessing websites and applications hosted by Web and Application Servers 212.

Messaging Broker 214 in Local Layer 210 may communicate real-time data, for example, to Enterprise Messaging Broker 264 in Enterprise Layer 260. Enterprise Messaging Broker 264 and Messaging Broker 214 may operate with different latencies. For example, Messaging Broker 214 may operate in real-time or substantially in real-time, while Enterprise Messaging Broker 264 may operate at a different pace. For example, Enterprise Messaging Broker 264 may operate in an independent manner from the real-time operation of Message Broker 214. Because additional processing may be involved, Enterprise Messaging Broker 264 may operate at a slower pace than Messaging Broker 214 which operates in real-time or near real-time.

Stream Processor 216 may receive the events from Messaging Broker 214 and then convert these events into meaningful variables and/or attributes for that session and/or for that user. Stream processor 216 may output real-time attributes, which may be based on the aggregation of the events. The variables and/or attributes may be used in a content decisioning process. For example, when the user selects a mortgage option, the user may further select interest rates, different products, etc. In isolation, it may be difficult to determine what the user may be interested in. Based on additional information collected, such as the time spent reviewing certain information, addition selections that the user may have made, visits to other resources and third parties, etc., an embodiment of the present invention may determine that the user may be looking for information related to mortgage products, or may be in the market for a new home.

Messaging Broker 214 may send the same or substantially same messages that are sent to Stream Processor 216, to Enterprise Messaging Broker 264 as well. This information may be used to develop relevant content at the Enterprise Layer 260. Also, in Enterprise Layer 260, Enterprise Messaging Broker 264 may also receive Data Management Platform (DMP) messages 261 and Streamlined Online Transaction Processing (OLTP) transactions 262. DMP messages 261 may receive data from third party providers or sources of data. For example, a user may search for mortgage rates on a website. DMP messages may include data from new home searches on a third party website. According to another example, the third party messages may indicate that the customer is now searching for new cars instead of a new home.

Streamlined Online Transaction Processing (OLTP) transactions 262 may retrieve purchase data, card transactions, e.g., credit card, debit card, loyalty card, etc., and general user browsing behavior.

Enterprise Messaging Broker 264 may receive messages/transactions from DMP messages 261 and streamlined OLTP transactions 262. As shown in FIG. 2, messages may be passed through to Common Data Reservoir 274 and/or Messaging Broker 214.

Common Data Reservoir 274 may receive data from Enterprise Messaging Broker 264. Common Data Reservoir 274 may receive and analyze the messages in, for example, a batch environment that may be run periodically (e.g., every hour, 24 hours, week, etc.). Based on this analysis, a determination may be made as to what content (e.g., advertisements, offers, rewards, messages, etc.) to present to the user. According to an exemplary application, Common Data Reservoir 274 may be a Hadoop® distributed storage system. Other storage and management devices may be implemented. Common Data Reservoir 274 may contain a master data repository.

Data Intelligence Platform 276 and/or Massively Parallel Processing (MPP) Platform 270 may perform processing, including evaluation and analysis, on the received data. According to an exemplary embodiment of the present invention, the data may be processed in batches periodically (e.g., hourly, daily, weekly, etc.), in response to a request or event, or as desired. An embodiment of the present invention may determine potential messages, advertisements, offers, information, etc. to present a user based on data that has been collected over a predetermined time period. Data Intelligence Platform 276 develops and/or stores algorithms that may be applied to the data in the Common Data Reservoir 274 by MPP platform 270. For example, MPP Platform 270 may execute algorithms provided by Data Intelligence Platform 276 on the data from Common Data Reservoir 274. Data Intelligence Platform 276 may also analyze and/or provide customer graph data, models, recommendations, etc. that may be used in identifying and developing content.

Marketing Platform 268 may execute marketing rules, business rules, campaigns, workflows, etc. on any offers, messages, etc. that may be staged to present to the user. For example, a customer may be identified as having an interest in coffee, but a marketing rule may only allow offers for coffee discounts to be presented in the afternoon. Thus, the marketing platform may cause the coffee offer not to be presented to the user. Also, user profile information may be accessed in real-time to better customize and personalize the content. The user profile information may also provide loyalty, affinity and/or other preferences. For example, a customer may be eligible for a co-branded offer on a particular airline. However, because the customer is a frequent flyer of another airline, the co-branded offer may not be presented to that user.

Relevant content may be routed through Content Store 266 with information from Pipeline 224 to personalize the customer's experience while interacting with the Web and Application Server 212. Content Store 266 may store and manage marketing information, campaign information, images, and/or personalized content that may be presented to a user. An embodiment of the present invention may also use real-time attributes in connection with other user information, profile information, purchase data, historical data, demographic data, season, timing, etc. An embodiment of the present invention may analyze historical data to identify spending habits, trends, etc. This information may be relevant in identifying targeted content for the user. Also consider marketing campaigns, marketing efforts, and/or other events or factors. Content Store 266 may also include content for delivery by email, text, voicemail, phone call, direct mail, and/or other form of communication and marketing.

Staging Area 272 may prepare offers, messages, etc. for presentation to the user. Staging area may consider user preferences, themes, timing, placement, length of presentation, etc. For example, a customer may not respond well to popup ads or messages but the customer may have a history of responding well to banner ads, specifically banner ads about a particular type of merchandise, brand, etc.

Data Router 278 may receive customer scores or other indicator of relevancy and may distribute this data to Local Layer 210 at the appropriate pod or local unit. According to an embodiment of the present invention, Data Router 278 may receive data regarding offers, advertisements, rewards, etc. that may not be determined in real-time. In other words, as part of Enterprise Layer 260, these offers, advertisements, rewards, etc. may have some latency associated with them. Data Router 278, however, may determine whether the advertisements, offers, rewards, etc. are still relevant and should be provided to the user. As shown in FIG. 2, Data Router 278 may provide data relating to batch attributes, customer graph data, model parameters, profiles from batch layer in Enterprise Layer 260 to Real-Time Indexed Store 218 and/or Real-Time Search and Queries 220 in Local Layer 210.

For example, Data Router 278 may provide a score, an attribute, etc. to real-time indexed store 218. Stream Processor 216 and Pipeline(s) 224 (with data from Data Router 278) may both update Real-Time Indexed Store 218 to ensure that it has optimal information based on batch and real-time calculations. For example, Pipeline(s) 224 and/or Data Router 278 may recommend a certain score for an offer, but if the customer does not interact with that offer, Stream Processor 216 may update the index to reflect that finding.

Also, Data Router 278 may provide the advertisements, offers, rewards, etc. to Staging Area 272. For example, real-time interaction may be passed to Staging Area 272; where information from Staging Area 272 may also be passed to local layer components (e.g., Real-Time Indexed Store 218, Real-Time Search and Queries 220) to be served online.

The Local Layer 210 may perform calculations just prior to presenting the content to the user. Real-time attributes may be used together with scores (or other indicators) generated in the batch layer of Enterprise Layer 260. For example, if a user is looking at mortgages, an offer for a mortgage product may be staged in Staging Area 272. Stream Processor 216, however, may detect that the user is now interested in an auto loan. Thus, the offer may be revised and better targeted to the user based on current real-time data.

An embodiment of the present invention scores and then ranks the content for a particular user or type of user in real-time. For example, Pipeline 224 may receive scoring data and ranking data along with other information to generate content decisions for a user in real-time. As the customer is browsing, the content, e.g., advertisements, may be changing based on the analysis and/or calculations performed in real-time.

An embodiment of the present invention is directed to a real-time search and query functionality. An embodiment of the present invention is directed to constructing content dynamically on-the-fly using a content identifier. For example, the search and query may identify content by a content identifier. For a particular advertisement, an embodiment of the present invention may retrieve the advertisement, text, graphic, variables, etc. For example, a customized content may offer 10,000 reward points if the customer acts now and accepts the offer.

Figure 3:
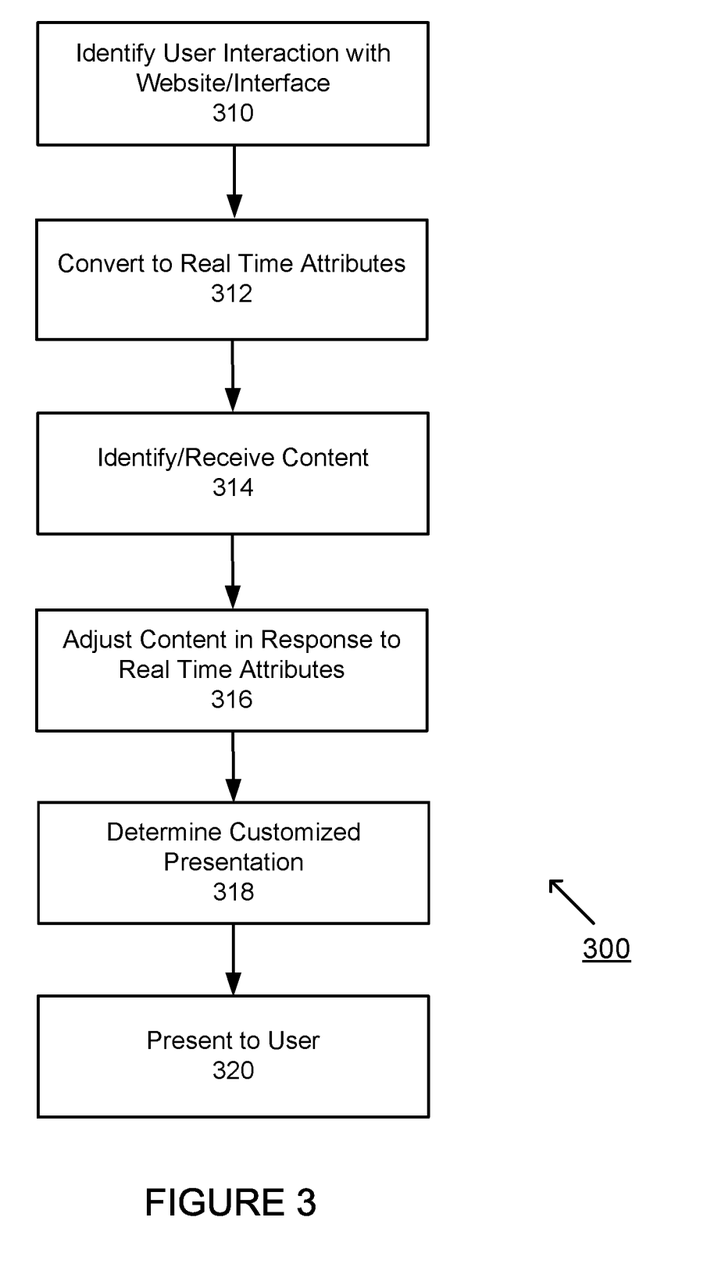
FIG. 3 is an exemplary flowchart illustrating a method for providing targeted content based on real-time data, according to an embodiment of the present invention.

FIG. 3 is an exemplary flowchart illustrating a method for providing targeted content based on real-time data, according to an embodiment of the present invention. At step 310, user interaction on a website may be identified. At step 312, the user interaction may be converted to real-time attributes. At step 314, relevant content may be identified and/or received. The content may be scored at the enterprise or by other unit. At step 316, the content may be adjusted in response to the real-time attributes. The scores of the content may be adjusted. At step 318, customized presentation may be determined. At step 320, the content in a customized presentation may be presented to the user. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 310, user interaction on a website may be identified. The user interaction may include mouse clicks, user input, search terms, requests for help/assistance, scroll down, scroll up, double click, single clicks, views of videos/tutorials, access to related or similar interfaces from third parties, etc. User interaction may provide an indication of what the user is most interested in. User interaction may also capture how long and how often a user visits a page or section of a page.

At step 312, the user interaction may be converted to real-time attributes. An embodiment of the present invention may be directed to identifying attributes associated with user interaction. Also, timing of the interaction and any association with other events may also provide insight into the user's needs.

At step 314, relevant content may be identified and/or received. The content may be scored at the enterprise or by other unit. For example, content that has been scored and generated may be made available to the local layer. Also, the customization of content may be performed at the local layer. The content may be identified based on matches, search terms, and/or other processing or algorithm used to identify relevant content based on real-time attributes.

At step 316, the content may be adjusted in response to the real-time attributes. The scores of the content may be adjusted. In this example, the real-time attributes may reveal additional insights into what is most relevant to the customer. For example, a customer may be searching for a moderate sized loan, however, based on the customer's interactions on the website, it may not be clear what the customer needs the loan for. An embodiment of the present invention may recognize that the customer is looking to remodel a home. Additional analysis (from third party sources, for example) may indicate that the customer is looking to add an extension to the house, specifically a bedroom and kitchen. For another customer, an embodiment of the present invention may identify that this customer needs a moderate sized loan to finance a vacation home in Florida.

At step 318, customized presentation may be determined. At step 320, the content in a customized presentation may be presented to the user. The customization may consider what the user prefers, it may also capture how best to approach the customer. For example, a particular customer may respond best to a particular type of content or even placement of the content. Other preferences may be applied.

Figure 4:
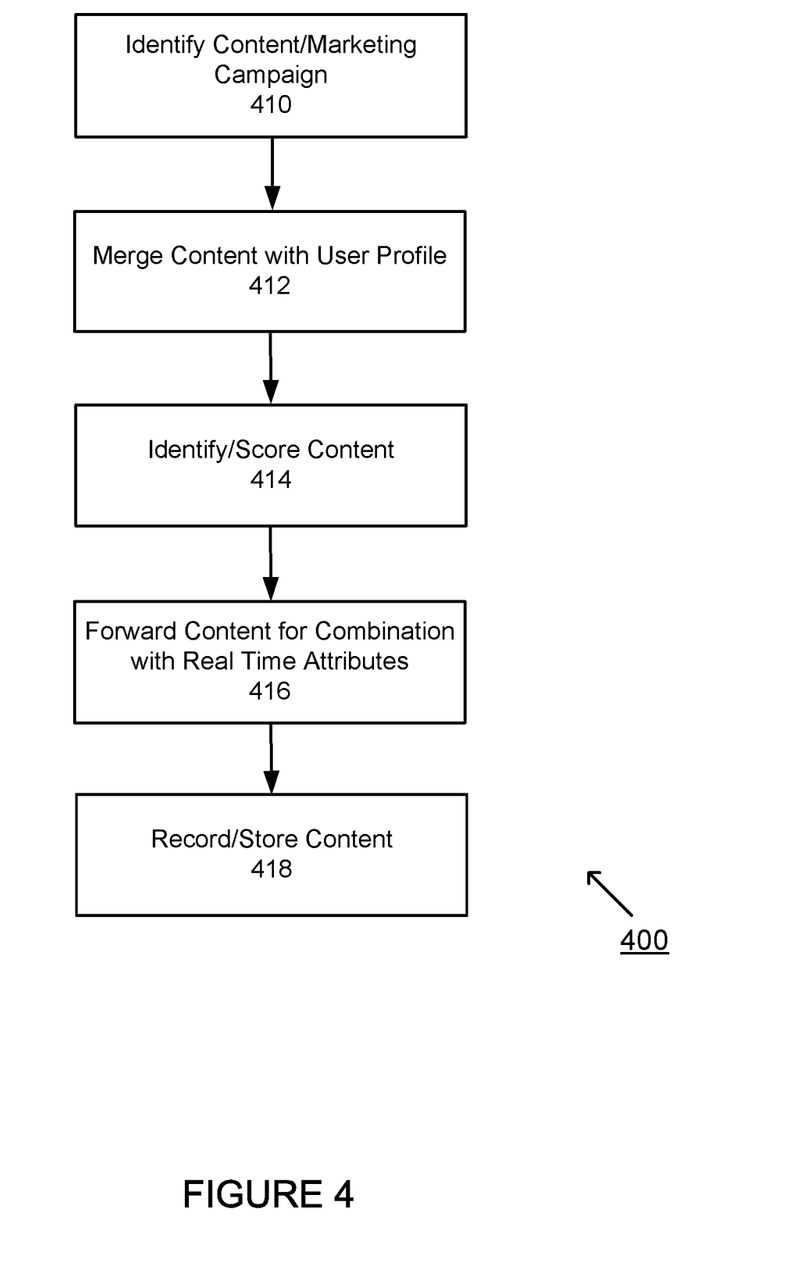
FIG. 4 is an exemplary flowchart illustrating a method for providing targeted content based on real-time data, according to an embodiment of the present invention.

FIG. 4 is an exemplary flowchart illustrating a method for providing targeted content based on real-time data, according to an embodiment of the present invention. At step 410, a marketing data may be identified. At step 412, the marketing data may be merged with customer profile data and/or third party data. At step 414, relevant content for the customer may be scored. At step 416, the content may be sent to a local pod or other unit for combination with real-time data. At step 418, the content may be recorded or stored. The order illustrated in FIG. 4 is merely exemplary. While the process of FIG. 4 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 410, a marketing data may be identified. An entity may introduce a new product or want to promote another type of product. This information may be considered in generating relevant content. The marketing data may also include vendors, brands, merchants, etc. for promotion. For example, an entity may have an affiliation with a third party electronics merchant who has a surplus of high definition televisions. The marketing data may be used to identify customers who are most likely to purchase this type of product.

At step 412, the marketing data may be merged with customer profile data and/or third party data. Customer profile data may also include demographics, preferences, whether the customer owns/rents, how often they visit a website, how often they access the website using their mobile device, and/or other behavior. Third party data may include visits to other providers and sources of data that may provide additional insight into the customer's current behavior at the entity's web site.

At step 414, relevant content for the customer may be scored. The content may be scored or provided with another indication of relevancy. Also, the content may include multiple indicators that identify various factors, including relevancy, popularity, profitability, etc.

At step 416, the content may be sent to a local pod or other unit for combination with real-time data. A router or other device may transmit the content to an appropriate local unit. The content may then be ranked or otherwise modified based on real-time data for the customer.

At step 418, the content may be recorded or stored. Content may be stored for further analysis and other feedback purposes.

An embodiment of the present invention is directed to providing unique customer experience through personalization, customization and contextualization. Personalization defines who the customer is as an individual, and understanding of the customer's information and using that to present them with a personalized experience. Customization allows the customers to express what they are looking for, through direct (e.g., request for information, etc.) and indirect ways (e.g., actions, behavior, search terms, etc.). Contextualization considers where the customer is in terms of location and situation. This may include geographical location, location within the actual site, whether or not the customer is in motion, timeframe, etc.

For personalization, an embodiment of the present invention is directed to personalizing the customer's content or their experience by providing information and an experience that's individual to the customer. An embodiment of the present invention may consider an entity's customer base, which may be further categorized by various different types of customers which represents a customer's personality and/or behavior. This information may be used to identify various traits about each customer type, e.g., demographics, how tech savvy are they, how comfortable are they with their finances, how likely are they to use a website versus actually call a customer service center, etc. This information may provide additional insight as to what interfaces will work best for each customer type. An entity may analyze this data about each customer type and further individualize the content presented to them based on the needs of each of the customer types.

An embodiment of the present invention is directed to using personalization to anticipate the customer's actions, which may involve predicting the actions that the customer want to accomplish and recognize the functionality that the customer needs in order to accomplish tasks and/or goals.

Also, supportive content may identify customer needs based on their behavior of with the context. For example, an entity may recommend videos, tutorials or blog posts, adaptive suggestions, etc. Smart content may be used to make predictions about a customer's behavior interests by looking at their browser behavior in order of tasks and actions. Usage based functionality may be used in prioritization, e.g., prioritize frequently used functions, functions the customer might need next based on their current behavior and needs. Personalized expression may be directed to customizing content and experience.

Customization may involve defining what content is important, organizing the content and expressing preferences or needs. This feature allows customers to express what content is important to them, and what should appear in their experience in order to accomplish their tasks effectively. This refers to defining content that is important to the customer, e.g., communication preferences, like or dislikes regarding advertisements, offers and rewards that were shown. The user may also organize content. For example, when a user logs into an account, the user may change the way the dashboard looks and even performs.

Customization may also involve identifying favorite tasks and actions, setting up preferred shortcuts, customizable defaults, etc. Personal expression may define a customer's personal user experience, preference for a complex interface versus a simple interface, turn on or off certain features, display settings preferences, etc.

Customization may also involve customizing a user profile, where customers may set up individual preferences to elicit a more meaningful experience from the entity, e.g., an entity may understand a customer's financial status better and better understand the customer's goals, etc.

Contextualization may recognize the customer's location, motion, time or weather. For example, if a customer's location is known, whether the customer is in motion, the time or the weather. This information may be used to present personalized greetings and information relevant to the task that they are trying to accomplish. For example, when it comes to location and motion, an embodiment of the present invention may use geographic location to show imagery. Voice interface options may be provided if the user is in motion. For example, if a customer is performing banking tasks while they are mobile, an embodiment of the present invention may invoke a voice option for safety reasons. Also, risk profile may be adjustable based on the customer's location, for example. For example, an embodiment of the present invention may recognize that the customer is out of town. In response, an embodiment of the present invention may apply a higher level of fraud protection. Also, time sensitive and/or location specific data may be provided to the customer, as an image, animation, greeting warning, alert, etc.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above.

Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ 8 operating system, Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A system for providing targeted content in real-time, the system comprising:
    a content customization platform that identifies customizing data for a user;
    an enterprise messaging broker that receives one or more messages from an external source that captures one or more actions from the user;
    a master data repository that receives the one or more messages and identifies a content for the user in response to the customizing data and the one or more messages; wherein the content has associated relevancy scores;
    a router that forwards the content and the associated relevancy scores to a first local processing unit that is configured to combine the associated relevancy scores with one or more real-time attributes for the user,
    wherein the router is utilized to provide, batch attribute data and model parameters, from a batch environment to an indexed store that is within a real-time layer;
    architecture that is configured to scale to include additional instances of hardware; and
    the first local processing unit, wherein the first local processing unit is also configured to:
        subsequently update the associated relevancy scores based on whether the user interacts with the content;
        split website user into specific pods based on geography and by designating each specific pod from among the specific pods to a discrete group of user of a website; and
        separate tasks into independent processing lanes,
    wherein each specific pod comprises corresponding physical infrastructure that has been designated to each discrete group of users, respectively,
    wherein the enterprise messaging broker receives one or more real-time messages that capture the user's real-time interactions with the website, wherein the website that comprises a webpage,
    wherein the website is configured to be responsive to any screen size, and
    wherein the website comprises a pipeline function that both reduces a blocking of elements of the webpage and reduces a waiting for the elements by enabling the elements to be asynchronously loaded onto the webpage.

2. The system of claim 1, wherein the one or more actions from the user, captured by the one or more messages, comprise a user input to a website.

3. The system of claim 1, wherein the content customization platform comprises campaign data.

4. The system of claim 1, further comprising:
    a staging platform that customizes presentation of the content for the user.

5. The system of claim 1, wherein the enterprise messaging broker has a different latency than a messaging broker at the first local processing unit, wherein the enterprise messaging broker receives real-time data from the messaging broker.

6. The system of claim 1, wherein the first local processing unit comprises a first pod from among a plurality of pods that are distributed within a local layer that comprises a real-time layer of distributed web and application servers.

7. The system of claim 6, further comprising:
a stream processor that streams, in real-time, user data changes to the first pod while back-end systems are at least one from among unavailable and impaired,
wherein a first location of the first pod is geographically closer to the user than a second location and wherein the second location comprises a location of the router.

8. The system of claim 1, wherein the associated relevancy scores of the content is based on a score and ranking of the content in real time based on the one or more actions from the user.

9. The system of claim 1, wherein the master data repository receives the one or more messages within the batch environment that is executed at a predetermined time interval to identify the content for the user, and wherein the predetermined time interval is at least one from among every hour, every 24 hours and every week.

10. The system of claim 1, wherein the first local processing unit comprises a first pod from among a plurality of pods that are distributed within a local layer that comprises a plurality of failure pods that respectively correspond to the plurality of pods, wherein the plurality of failure pods respectively provide additional resource capacity to support the plurality of pods during failover, and wherein the plurality of failover pods includes a first failure pod that provides corresponding support to the first pod during an associated failover.

11. A method for providing targeted content in real-time, the method comprising:
identifying, via a content customization platform, customizing data for a user;
receiving, via an enterprise messaging broker, one or more messages from an external source that captures one or more actions from the user;
receiving, via a master data repository, the one or more messages and identifying a content for the user in response to the customizing data and the one or more messages; wherein the content has associated indication of relevancy scores;
forwarding, via a router, the content and the associated relevancy scores to a first local processing unit that combines the associated relevancy scores with one or more real-time attributes for the user;
utilizing the router to provide batch attribute data, and model parameters, from a batch environment to an indexed store that is within a real-time layer;
utilizing an architecture that is configured to scale to include additional instances of hardware;
subsequently updating, by the first local processing unit, the associated relevancy scores based on whether the user interacts with the content,
splitting website users into specific pods based on geography and by designating each specific pod from among the specific pods to a discrete group of users of a website; and
separating tasks into independent processing lanes,
wherein each specific pod comprises corresponding physical infrastructure that has been designated to each discrete group of users, respectively,
wherein the enterprise messaging broker receives one or more real-time messages that capture the user's real-time interactions with the website, wherein the website comprises a webpage,
wherein the website is configured to be responsive to any screen size, and
wherein the website comprises a pipeline function that both reduces a blocking of elements of the webpage and reduces a waiting for the elements by enabling the elements to be asynchronously loaded onto the webpage.

12. The method of claim 11, wherein the one or more actions from the user, captured by the one or more messages, comprise a user input to a website.

13. The method of claim 11, wherein the content customization platform comprises-marketing campaign data.

14. The method of claim 11, further comprising:
customizing, via a staging platform, presentation of the content for the user.

15. The method of claim 11, wherein the enterprise messaging broker has a different latency than a messaging broker at the first local processing unit, wherein the enterprise messaging broker receives real-time data from the messaging broker.

16. The method of claim 11, wherein the first local processing unit comprises a first pod from among a plurality of pods that are distributed within a local layer that comprises a real-time layer of distributed web and application servers.

17. The method of claim 16, further comprising:
being disconnected from back-end systems due to at least one from among back-end system unavailability and back-end system impairment; and
permitting user data changes to be streamed, in real-time, to the first pod while the back-end systems are at least one from among unavailable and impaired,
wherein a first location of the first pod is geographically closer to the user than a second location and wherein the second location comprises a location of the router.

18. The method of claim 11, wherein the associated relevancy scores of the content is based on a score and ranking of the content in real time based on the one or more actions from the user.

19. The method of claim 11, wherein the master data repository receives the one or more messages within the batch environment that is executed at a predetermined time interval to identify the content for the user, and wherein the predetermined time interval is at least one from among every hour, every 24 hours and every week.

20. The method of claim 11, wherein the first local processing unit comprises a first pod from among a plurality of pods that are distributed within a local layer that comprises a plurality of failure pods that respectively correspond to the plurality of pods, wherein the plurality of failure pods respectively provide additional resource capacity to support the plurality of pods during failover, and wherein the plurality of failover pods includes a first failure pod that provides corresponding support to the first pod during an associated failover.

* * * * *